INVENTORS,
HANS REIFENHÄUSER
PAUL REITEMEYER
BY Karl F. Ross
ATTORNEY

INVENTORS.
HANS REIFENHÄUSER
PAUL REITEMEYER
BY
Karl J. Ross
ATTORNEY

United States Patent Office 3,681,176
Patented Aug. 1, 1972

3,681,176
ULTRASONIC WELDING AND CUTTING
APPARATUS
Hans Reifenhauser, Troisdorf, and Paul Reitemeyer,
Bergheim, Germany, assignors to Reifenhauser, KG,
Troisdorf, Germany
Filed Aug. 15, 1969, Ser. No. 850,569
Claims priority, application Germany, Aug. 23, 1968,
P 17 79 534.5
Int. Cl. B29c 27/08; B32b 31/16, 31/18
U.S. Cl. 156—580         7 Claims

ABSTRACT OF THE DISCLOSURE

An apparatus for the ultrasonic welding and cutting of a pair of juxtaposed synthetic-resin sheets has a sonotrode and an anvil, one being engageable with the other, upon their relative movement toward one another. Mounted on the anvil or sonotrode is a spacer element in the form of a ridge running along the middle of the welding face of the tool. This ridge has a height that is slightly less than the combined thickness of the two sheets so that when the spacer ridge engages the opposite welding face it cuts the sheets while the surfaces of the face blanking the spacer ridge coact with the opposite face to form a welded seam.

---

Figure 1:
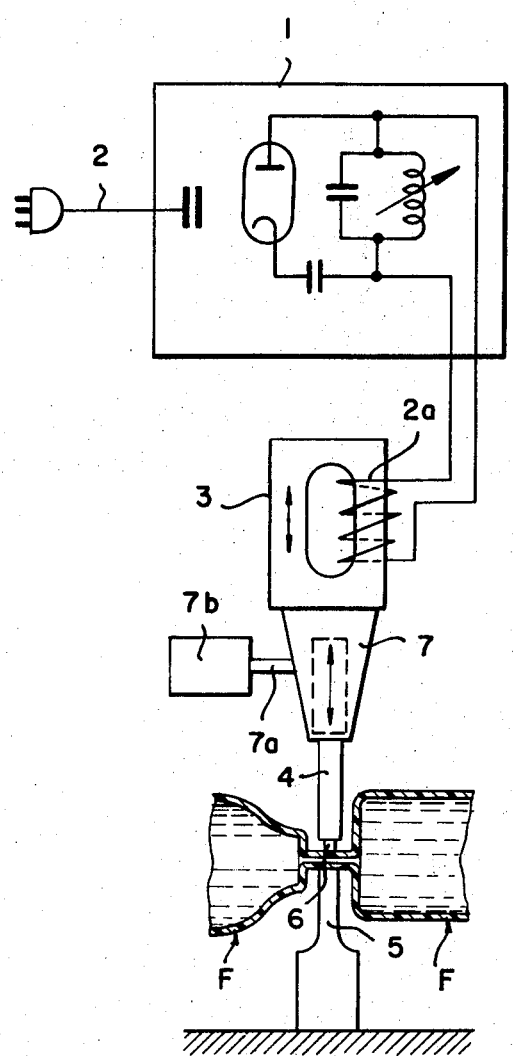

The present invention relates to an apparatus for welding together and cutting a pair of juxtaposed synthetic-resin sheets.

Ultrasonic welding and cutting devices are known which have a sonotrode and an anvil between which sheets of usually rigid or semirigid synthetic resin material are engaged for welding and cutting. The sonotrode is moved toward the anvil, or vice versa, while a ridge on the one mates with a groove on the other to cut the material. A gap of 0.2 to 0.5 mm. is maintained between all parts of the two tools; they never touch one another. Such an arrangement may from a poor edge seam that tends to leak.

It has also been proposed to stretch a wire between the two tools and then approach the two flat welding faces of the tools to each other to form a gap equal to the diameter of the wire plus 0.2 mm. to 0.5 mm. In this manner the wire defines the parting or cut line. Although this system does indeed form a good leakproof seam, the connection between the wire and the vibrating sonotrode or anvil is so poor that it is impossible to tell exactly how long the welding and cutting operation will take. Thus, it is necessary to set the apparatus on a long work cycle to ensure full completion of the operation. Furthermore, the wire has a very short service life so that frequent halts in production must be made while it is replaced. In general, with such devices the machine cycle is prolonged and the system uneconomical.

It is, therefore, the general object of the present invention to provide an improved apparatus for welding together and cutting a pair of juxtaposed synthetic-resin sheets.

A more specific object is to provide such an apparatus which overcomes the above-described disadvantages of the prior-art devices.

It is an object of the present invention to provide an apparatus of the above-mentioned type which allows for a quick and sure welding and cutting while forming a very strong weld seam.

The above objects are attained, in accordance with a feature of the present invention by an apparatus for welding together and cutting a pair of juxtaposed synthetic-resin sheets having a sonotrode tool connected to ultrasonic-generating means, and an anvil tool, one of the tools being hydraulically displaceable towards the other.

One of the tools is provided with a spacer element while the other is flat. This spacer element is advantageously elongated and of rectangular cross section, e.g., a ridge extending down the center of its respective tool. For cutting, one of the tools is displaced toward the other until the element engages it, thereby cutting the sheets. As long as the element is not higher than the combined thicknesses of the sheets, a weld is formed to each side of the cut as the cut is being made by flat faces of the tool provided with the ridge, but flanking same, these faces being parallel to and confronting the flat surface of the other tool. The latter surface must project laterally of the ridge to accommodate the welding operation.

According to another feature of the present invention, the tool on which the element is mounted is formed to each side thereof with steps extending parallel to the element. Such an arrangement produces an extremely strong seam.

Figure 2:
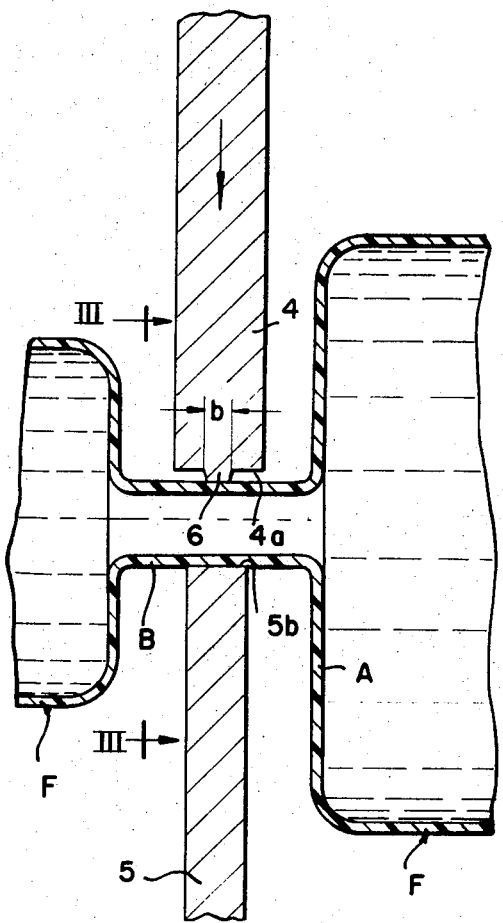
Figure 2A:
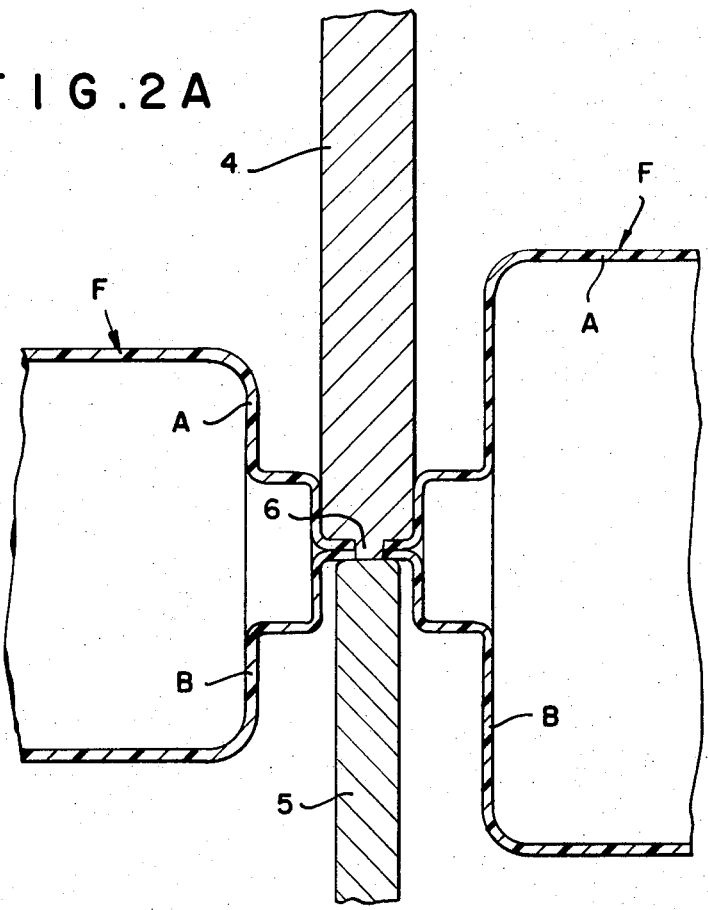
Figure 3:
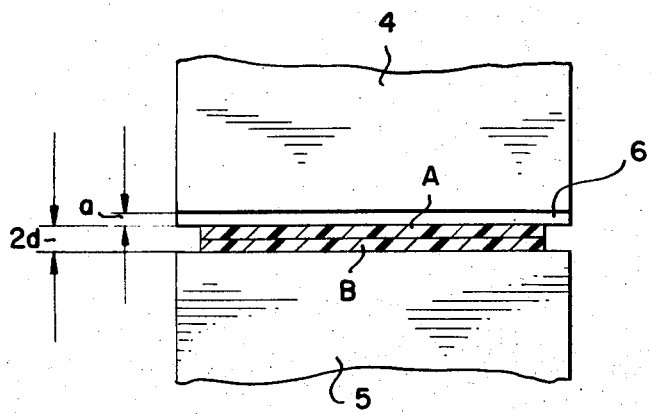
Figure 4:
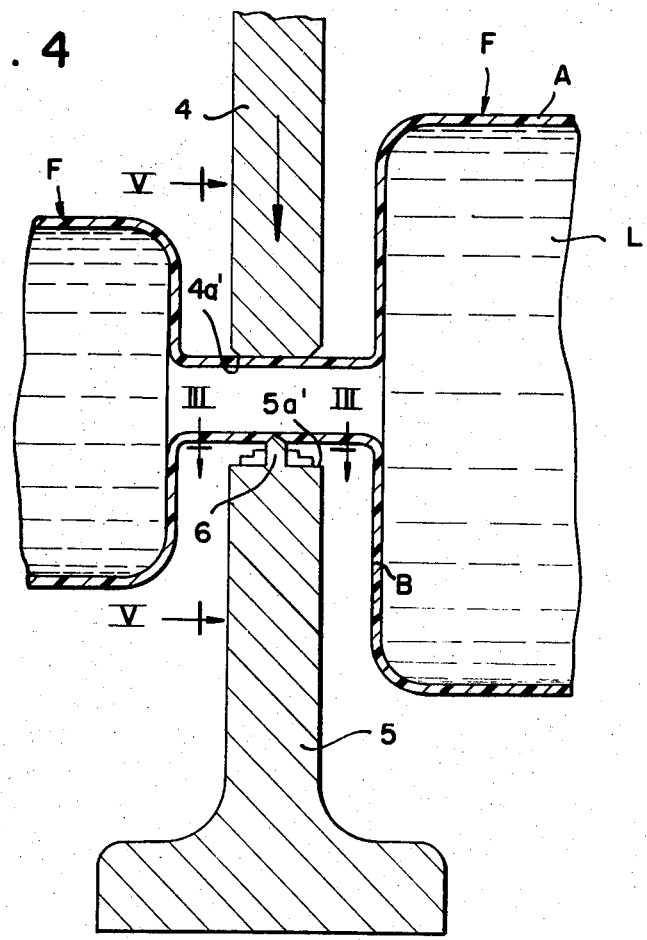
Figure 6:
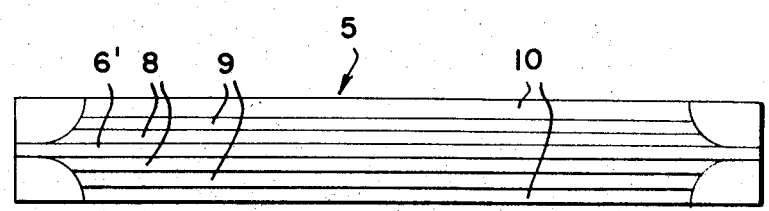
Figure 5:
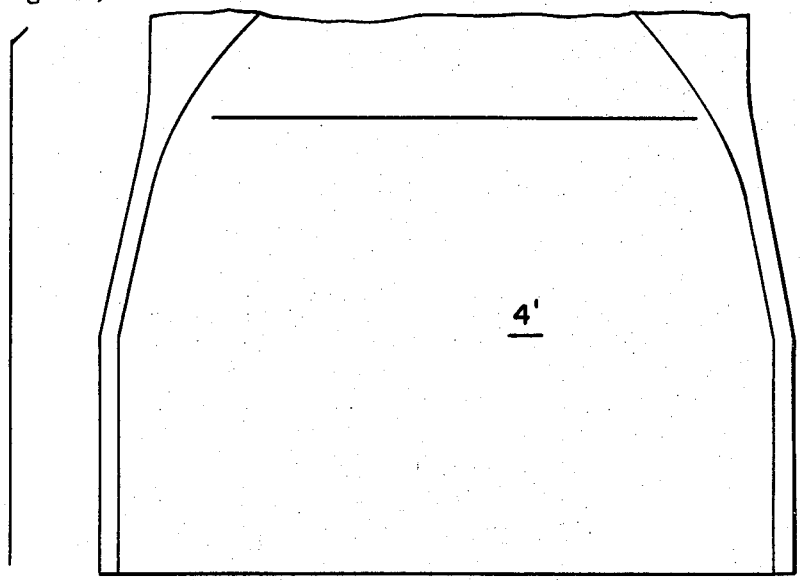
Figure 5:
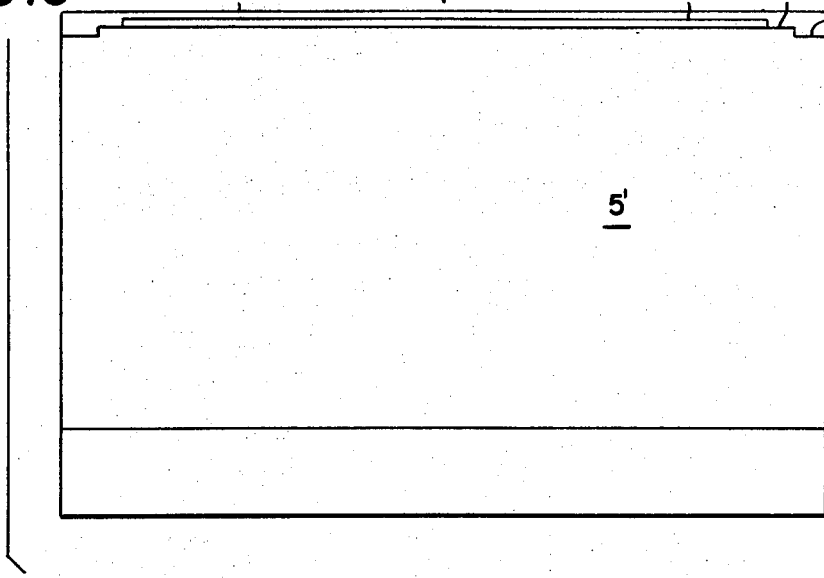
Figure 7:
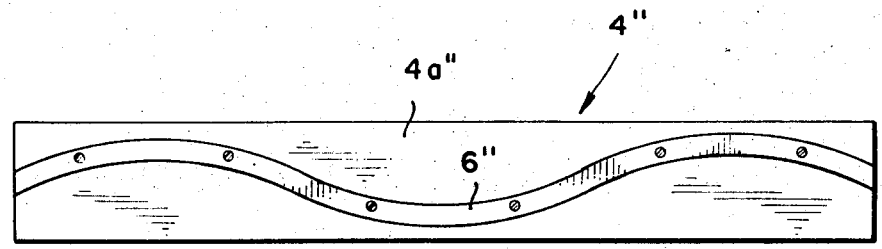

The above and other objects, features, and advantages of the present invention will become more readily apparent from the following description reference being made to the accompanying drawing, in which:

FIG. 1 is a largely schematic view of an apparatus;
FIG. 2 is a detail of FIG. 1, in enlarged scale;
FIG. 2A is a view similar to FIG. 2, showing the apparatus in a later operational position;
FIG. 3 is a section taken along the line III—III of FIG. 2;
FIG. 4 is a view similar to FIG. 2, showing another embodiment of the present invention;
FIG. 5 is a view taken along the line V—V of FIG. 4;
FIG. 6 is a view taken along the line VI—VI of FIG. 4 and
FIG. 7 is a view similar to FIG. 6 showing another embodiment of the present invention.

As shown in FIGS. 1, 2, and 3 the apparatus includes ultrasonic wave generator 1 which can be plugged in by means of a line cord 2, to a source of alternating current, a sonotrode 3 connected thereto via a coil 2a, and an anvil 5. A tuned-plate or tuned-plate tuned-grid oscillator as disclosed in chapter 27 of Fundamentals of Electronics (U.S. Gov't Printing Office, Washington, D.C., July 1957) is used in the generator 1.

The sonotrode 4, as particularly well seen in FIG. 3, is formed as a slab which is guided in a cylinder 7. Hydraulic fluid fed into this cylinder 7 through a conduit 7a from a control device 7b can move this sonotrode 4 up and down, into and out of engagement with a pair of thermoplastic sheets A and B which form bottles F filled with a liquid L.

The sonotrode 4 has a flat welding face 4a and the anvil a similar confronting flat face 5. The face 4a, however, is formed with a longitudinally extending spacer 6 which is centrally located and leaves the face 4a exposed on both sides in the form of shoulders.

As shown in FIG. 3, the spacer 6 extends fully across the sonotrode 4 which is itself wider than the sheets A and B. In addition, the spacer 6, which is of uniform rectangular cross section has a height $a$ above the face $4a$ which is less than the combined thickness $2d$ of the sheets A and B. A height $a$ of 0.5 mm. and a width $b$ of 0.3 mm. is advantageous.

In this manner, as two sheets A and B are passed between the tools 4 and 5, the cylinder 7 is pressurized at a predetermined steady pressure by the device 7b to move the sonotrode 4 down against the top sheet A. As the two sheets A and B are compressed between the tools 4 and 5, the generator 1 is switched on so that its ultrasonic energy causes the sheets A and B to melt. Since the sonotrode 4 is advanced until the spacer 6 engages fully against the face 5a, the sheets A and B are both cut by the spacer 6 which forces out the melted or flowable thermoplastic material. At the same time, since the height $a$ is less than the thickness $2c$, the two sheets are welded together to each side of the cut formed by the spacer 6. When the cylinder 7 is depressurized and the sonotrode 4 is raised, the two bottles F are fully separated from each other, and have firmly welded and very neat end seams.

FIGS. 4, 5, and 6 show an alternative embodiment of the present invention having a sonotrode 4' and an anvil 5' each having a respective welding face 4a' and 5a'. The anvil 5' is itself formed with a spacer 6' rising up 1.5 mm. above the face 5a' and extending from one end to the other, as shown in FIG. 6. On each longitudinal side of the spacer 6' the anvil 5' is formed with steps 8, 9, and 10. Each step is 0.5 mm. high and 0.5 mm. wide and the final step 10 is on a level with the face 5a'. As shown in FIG. 5, the sonotrode 4' is slightly shorter than the anvil 5' and just the same length of the step 9, since the stepped portions 8 and 9 of the anvil 5' are shorter than the spacer 6'.

With such an arrangement, the bottles F are separated from each other as in FIGS. 1-3, but here a particularly strong seam is made, due mainly to the stepping of the anvil 5'. At the same time, since the steps 8, 9, and 10 are shorter than the spacer 6 (i.e., set back therefrom) the corners of the bags for bottles F are seamed such that they will be round and full, thereby preventing leakage and rupture at this point.

FIG. 7 shows a sonotrode which has, screwed to its face 4a'', a sinusoidal spacer element 6''. Such a construction produces a wavy edge on the bag or bottle, this type of end is less likely to rip than a straight one, in general.

We claim:

1. An apparatus for welding together and cutting a pair of juxtaposed synthetic-resin sheets, said apparatus comprising:
    ultrasonic-wave generating means;
    a sonotrode tool connected to said generating means and having a welding face engageable with one of said sheets;
    an anvil tool having a welding face engageable with the other of said sheets opposite said sonotrode tool;
    a spacer element on one of said faces engageable through said sheets with the other of said faces, said one face having a pair of surfaces flanking said element, said element having a height above said surfaces which is smaller than the combined thickness of said sheets, the other face being planar;
    means for displacing one of said tools toward the other of said tools to force said element through said sheets against said other face, said element being elongated and of substantially rectangular cross section, said surfaces flanking said element being formed with at least one step extending parallel to said spacer element wherein said spacer element is longer than said steps.

2. The apparatus defined in claim 1 wherein said element is on said sonotrode tool.

3. The apparatus defined in claim 1 wherein said element is of uniform cross section.

4. The apparatus defined in claim 3 wherein said element is substantially 0.3 mm. wide and 0.5 mm. high.

5. The apparatus defined in claim 1 wherein said spacer element is unitary with one of said tools.

6. The apparatus defined in claim 1 wherein said means for displacing one of said tools is a hydraulic piston arrangement.

7. The apparatus defined in claim 1 wherein said other of said faces is flat.

References Cited

UNITED STATES PATENTS

| | | | |
|---|---|---|---|
| 3,234,069 | 2/1966 | Saas | 156—515 |
| 3,308,003 | 3/1967 | Deans | 156—580 |
| 3,378,429 | 4/1968 | Obeda | 156—580 |
| 3,445,307 | 5/1969 | Balamuth et al. | 156—73 |
| 3,033,257 | 5/1962 | Weber | 156—515 |

SAMUEL FEINBERG, Primary Examiner

J. J. DEVITT, Assistant Examiner

U.S. Cl. X.R.

156—73, 515